USO09838617B2

(12) United States Patent
Koh et al.

(10) Patent No.: US 9,838,617 B2
(45) Date of Patent: Dec. 5, 2017

(54) SMART DEVICE DETECTION FOR DISPLAY DEVICES

(71) Applicant: Dell Products L.P., Round Rock, TX (US)

(72) Inventors: Jin Shiong Koh, Singapore (SG); Khang Chian Yong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 15/089,657

(22) Filed: Apr. 4, 2016

(65) Prior Publication Data

US 2017/0289464 A1  Oct. 5, 2017

(51) Int. Cl.
*H04N 5/268* (2006.01)
*H04N 5/44* (2011.01)

(52) U.S. Cl.
CPC .............. *H04N 5/268* (2013.01); *H04N 5/44* (2013.01)

(58) Field of Classification Search
USPC ....... 348/706, 705, 714, 716, 719, 725, 739, 348/647, 688, 504, 523, 528, 567, 429.1, 348/423.1, 432.1, 474, 344, 361, 363, 348/376, 231.3, 158, 69, 14.11, 509
See application file for complete search history.

(56) References Cited

U.S. PATENT DOCUMENTS

| 6,137,539 | A  | * | 10/2000 | Lownes | H04N 5/44513 348/569 |
| 6,525,775 | B1 | * | 2/2003 | Kahn | G06F 8/65 348/460 |
| 6,728,776 | B1 | * | 4/2004 | Colbath | H04L 29/06027 348/E7.061 |
| 7,362,381 | B1 | * | 4/2008 | Stahl | H04N 21/43632 348/569 |
| 2004/0268392 | A1 | * | 12/2004 | Tanaka | H04H 60/72 725/42 |
| 2007/0089131 | A1 | * | 4/2007 | Iwahashi | H04N 5/44543 725/38 |
| 2007/0241990 | A1 | * | 10/2007 | Smith | G09G 5/003 345/5 |
| 2008/0239160 | A1 | * | 10/2008 | Ho | H04N 5/44591 348/706 |

(Continued)

*Primary Examiner* — Jefferey F Harold
*Assistant Examiner* — Mustafizur Rahman
(74) *Attorney, Agent, or Firm* — Terrile, Cannatti, Chambers & Holland, LLP; Stephen A. Terrile

(57) ABSTRACT

A system, method, and computer-readable medium for performing an intelligent display device detection operation. With the intelligent display device detection operation even if a user has not turned on a second information handling system, the display device automatically switch a video input from a first information handling system to the second information handling system when the second information handling system is coupled to the display device. When the user powers on the second information handling system, a video stream provided by the second information handling system is immediately presented on the display device. In certain embodiments, the intelligent display device detection operation comprises one or more of a signal detection operation which detects which input port is transmitting a signal and a cable detection operation which detects which input port is coupled to a cable.

18 Claims, 6 Drawing Sheets

(56) References Cited

U.S. PATENT DOCUMENTS

| | | | | |
|---|---|---|---|---|
| 2011/0141356 A1* | 6/2011 | Nakagawa | ......... | G02B 27/2264 348/521 |
| 2012/0026327 A1* | 2/2012 | Jackson | ................ | G09B 5/065 348/143 |
| 2013/0346776 A1* | 12/2013 | Wang | ........................ | G06F 3/14 713/323 |
| 2015/0077516 A1* | 3/2015 | Coto-Lopez | ......... | H04N 5/2258 348/43 |
| 2015/0356626 A1* | 12/2015 | Chawla | ................ | H04W 4/025 705/14.66 |
| 2016/0050375 A1* | 2/2016 | Soffer | .................... | H04N 5/268 348/445 |

* cited by examiner

| VALID SIGNALS | RETURN TO LAST VALID PORT (SWITCH IN SEQUENCE -> UNPLUG) | | | | | |
|---|---|---|---|---|---|---|
| | USER SELECT/CABLE DETECT (YES) | | | | UNPLUG | NO SIGNAL |
| 4 PORTS | SELECT = A | SELECT = B | SELECT = C | SELECT = D | | |
| ABCD | A | B | C | D | UNPLUG D | MUTE D |
| ABC[D]* | A | B | C | OOR | RETURN C | RETURN C |
| ABC* | A | B | C | NoSignal | RETURN C | RETURN C |
| ABC* | A | B | C | NoCable | - | - |
| ABD | A | B | INVALID** | D | RETURN B | RETURN B |
| ACD | A | INVALID** | C | D | RETURN C | RETURN C |
| AC[D]* | A | INVALID** | C | OOR | RETURN C | RETURN C |
| AC* | A | INVALID** | C | NoSignal | RETURN C | - |
| AC* | A | INVALID** | C | NoCable | - | - |
| AD | A | INVALID** | INVALID** | D | RETURN A | RETURN A |
| 3 PORTS | SELECT = A | SELECT = B | SELECT = C | | | |
| ABC | A | B | C | - | UNPLUG C | MUTE C |
| AB[C]* | A | B | OOR | - | RETURN B | RETURN B |
| AB* | A | B | NoSignal | - | RETURN B | RETURN B |
| AB* | A | B | NoCable | - | - | - |
| AC | A | INVALID** | C | - | RETURN A | RETURN A |

* CONSIDER NoSignal/NoCable/OOR CASES: []=OOR SOURCE
** INCLUDES No/Signal/NoCable/OOR CASES

FIG. 4

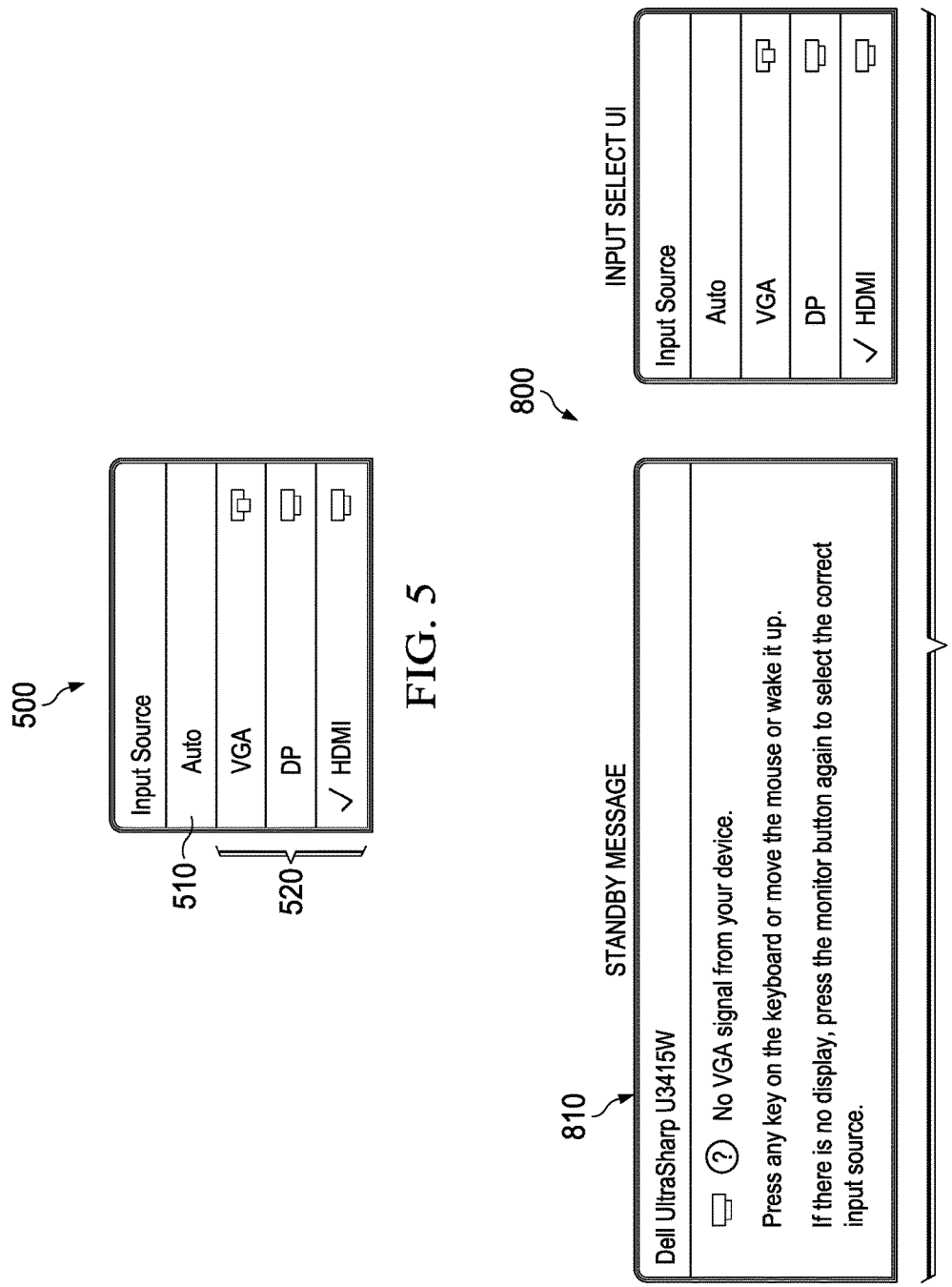

ACTION TABLE MATRIX OF AUTO SELECT FUNCTION (INITIAL AUTO -> SEND SIGNAL/PLUG/UNPLUG/POWER)

| SOURCE CONDITION | | CASE 1: SOURCE DETECTION (SEND SIGNALS) | | | CASE 2: CABLE DETECTION (PLUG IN) | | | CASE 3: UNPLUG CABLE | | | CASE 4: POWER CYCLE | |
|---|---|---|---|---|---|---|---|---|---|---|---|---|
| SOURCE A | SOURCE B | INITIAL | A SIGNALS | B SIGNALS | INITIAL | PLUG A | PLUG B | INITIAL | UNPLUG A | UNPLUG B | INITIAL | AUTO |
| Y | Y | A | - | - | A | - | - | A | B | A | A | A |
| Y | OOR | A | - | - | A | - | - | A | OOR | A | A | A |
| Y | NoSignal | A | - | A | A | - | - | A | NoCable | - | A | A |
| Y | NoCable | A | - | - | A | - | B* | A | NoCable | - | A | A |
| OOR | Y | OOR | - | - | OOR | - | - | OOR | B | OOR | OOR | OOR |
| OOR | OOR | OOR | - | - | OOR | - | - | OOR | OOR | OOR | OOR | OOR |
| OOR | NoSignal | OOR | - | OOR | OOR | - | - | OOR | NoCable | - | OOR | OOR |
| OOR | NoCable | OOR | - | - | OOR | - | B* | OOR | NoCable | - | OOR | OOR |
| NoSignal | Y | B | B | - | B | - | - | B | B | NoCable | B | B |
| NoSignal | OOR | OOR | OOR | - | OOR | - | - | OOR | OOR | NoCable | OOR | OOR |
| NoSignal | NoSignal | NoSignal | - | B | NoSignal | - | - | NoSignal | NoCable | NoSignal | NoSignal | NoSignal |
| NoSignal | NoCable | NoSignal | - | - | NoSignal | - | B* | NoSignal | NoCable | - | NoSignal | NoSignal |
| NoCable | Y | B | B | - | B | A* | - | B | - | NoCable | B | B |
| NoCable | OOR | OOR | A | - | OOR | A* | - | OOR | - | NoCable | OOR | OOR |
| NoCable | NoSignal | NoCable | - | B | NoCable | A* | - | NoCable | - | NoCable | NoCable | NoCable |
| NoCable | NoCable | NoCable | - | - | NoCable | A* | B* | NoCable | - | - | NoCable | NoCable |

610    612    614    616    600

\* NORMAL DISPLAY IF THERE IS SIGNAL, OTHERWISE NoSignal

FIG. 6

ACTION TABLE MATRIX IN CASE OF USER SELECTION (SELECT INPUT -> SEND SIGNAL/PLUG/UNPLUG/POWER)

| SOURCE CONDITION | | CASE 1: SOURCE DETECTION (SEND SIGNALS) | | | CASE 2: CABLE DETECTION (PLUG IN) | | | CASE 3: UNPLUG CABLE | | | CASE 4: POWER CYCLE | |
|---|---|---|---|---|---|---|---|---|---|---|---|---|
| SOURCE A | SOURCE B | SELECT=A | A SIGNALS | B SIGNALS | SELECT=A | PLUG A | PLUG B | SELECT=A | UNPLUG A | UNPLUG B | SELECT=A | AUTO |
| Y | Y | A | A | - | A | - | - | A | B | A | A | A |
| Y | OOR | A | A | - | A | - | - | A | OOR | A | A | A |
| Y | NoSignal | A | A | A | A | - | - | A | NoCable | A | A | A |
| Y | NoCable | A | A | - | A | - | B* | A | NoCable | - | A | A |
| OOR | Y | OOR | - | - | OOR | - | - | OOR | B | OOR | OOR | OOR |
| OOR | OOR | OOR | - | - | OOR | - | - | OOR | OOR | OOR | OOR | OOR |
| OOR | NoSignal | OOR | - | OOR | OOR | - | - | OOR | NoCable | OOR | OOR | OOR |
| OOR | NoCable | OOR | - | - | OOR | - | B* | OOR | NoCable | - | OOR | OOR |
| NoSignal | Y | NoSignal | A | - | NoSignal | - | - | NoSignal | B | NoSignal | NoSignal | B |
| NoSignal | OOR | NoSignal | A | - | NoSignal | - | - | NoSignal | OOR | NoSignal | NoSignal | OOR |
| NoSignal | NoSignal | NoSignal | A | NoSignal | NoSignal | - | - | NoSignal | NoCable | NoSignal | NoSignal | NoSignal |
| NoSignal | NoCable | NoSignal | A | - | NoSignal | - | B* | NoSignal | NoCable | - | NoSignal | NoSignal |
| NoCable | Y | NoCable | - | - | NoCable | A* | - | NoCable | - | NoCable | NoCable | B |
| NoCable | OOR | NoCable | - | - | NoCable | A* | - | NoCable | - | NoCable | NoCable | OOR |
| NoCable | NoSignal | NoCable | - | NoCable | NoCable | A* | - | NoCable | - | - | NoCable | NoCable |
| NoCable | NoCable | NoCable | - | - | NoCable | A* | B* | NoCable | - | - | NoCable | NoCable |

\* NORMAL DISPLAY IF THERE IS SIGNAL, OTHERWISE NoSignal

FIG. 7

SMART DEVICE DETECTION FOR DISPLAY DEVICES

BACKGROUND OF THE INVENTION

Field of the Invention

The present invention relates to information handling systems. More specifically, embodiments of the invention relate to smart device detection for display devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to couple one or more information handling systems to a display device. An issue can arise when an information handling system is coupled to a display device and a user wishes to couple an additional information handling system (e.g., a tablet type information handling system) to the display device. Often it is necessary to power on the second information handling system, couple the information handling system to the display device and then manually switch the input source of the display device from the input source connection of the first information handling system to the input source connection of the second information handling system. When the user disconnects the second information handling system, the user often must manually switch the video input source back to the first input source. These procedures can be detrimental to user experience, especially for users who frequently connect and disconnect a plurality of information handling systems to their display device.

SUMMARY OF THE INVENTION

A system, method, and computer-readable medium are disclosed for performing an intelligent display device detection operation. In certain embodiments, an intelligent display device detection system performs the intelligent display device detection operation.

With the intelligent display device detection operation even if a user has not turned on a second information handling system, the display device automatically switch a video input from a first information handling system to the second information handling system when the second information handling system is coupled to the display device. When the user powers on the second information handling system, a video stream provided by the second information handling system is immediately presented on the display device. In certain embodiments, the intelligent display device detection operation comprises one or more of a signal detection operation which detects which input port is transmitting a signal and a cable detection operation which detects which input port is coupled to a cable.

When the user disconnects the second information handling system, the display device automatically switches the video input back to the first information handling system. In certain embodiments, the intelligent display device detection system provides an option to disable the intelligent display device detection operation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 shows a matrix of the intelligent display device detection operation when performing an intelligent detection function.

FIG. 5 shows an example screen presentation of an on screen display input source list of an intelligent display device detection operation.

FIG. 6 shows a matrix of the intelligent display device detection operation when performing an auto select intelligent detection function.

FIG. 7 shows a matrix of the intelligent display device detection operation when performing a user select intelligent detection function.

FIG. 8 shows an example screen presentation of an on screen display during an information handling system standby mode of operation of an intelligent display device detection operation.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
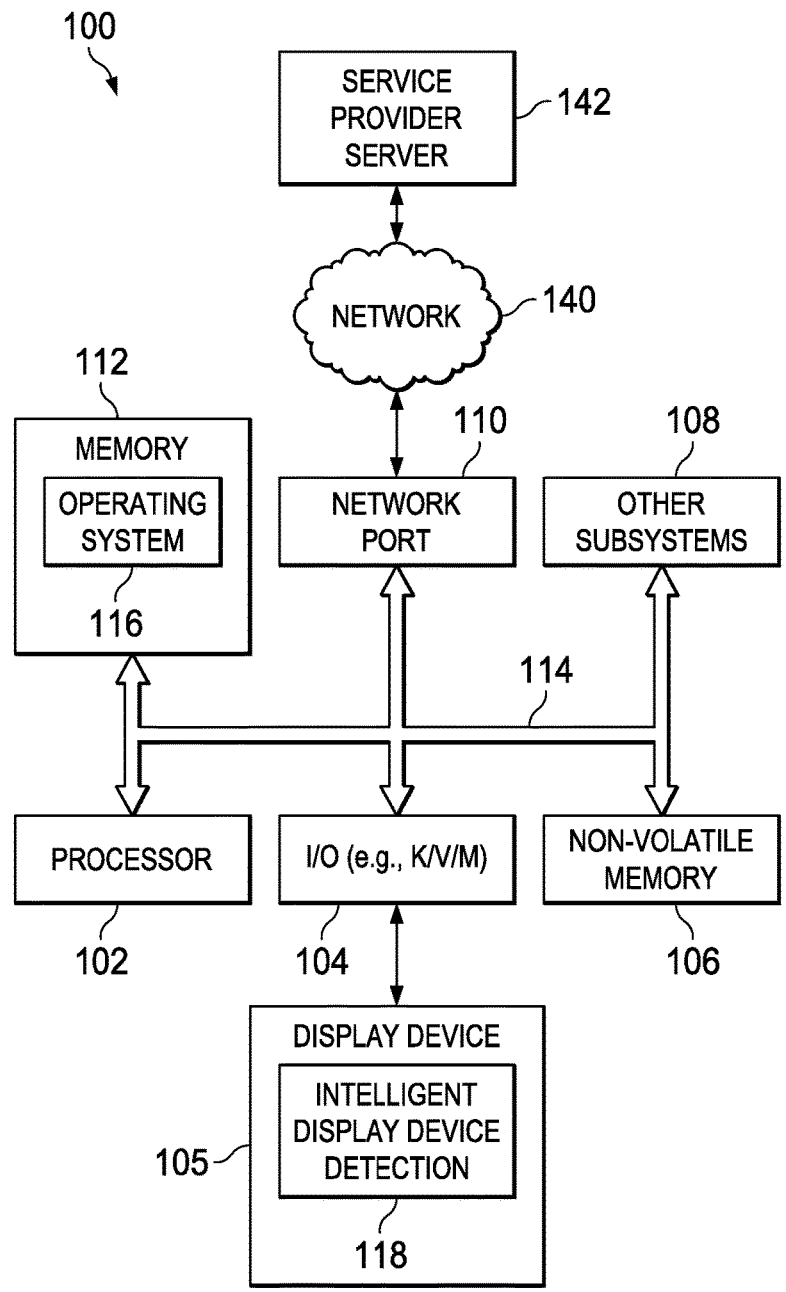
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display device 105, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116.

In various embodiments the display device 105 includes an intelligent display device detection module 118. In certain embodiments, the intelligent display device detection module 118 performs an intelligent display device detection operation. With the intelligent display device detection operation even if a user has not turned on a second information handling system, the display device automatically switch a video input from a first information handling system to the second information handling system when the second information handling system is coupled to the display device. When the user powers on the second information handling system, a video stream provided by the second information handling system is immediately presented on the display device. In certain embodiments, the intelligent display device detection operation comprises one or more of a signal detection operation which detects which input port is transmitting a signal and a cable detection operation which detects which input port is coupled to a cable.

When the user disconnects the second information handling system, the display device automatically switches the video input back to the first information handling system. In certain embodiments, the intelligent display device detection system provides an option to disable the intelligent display device detection operation.

Figure 2:
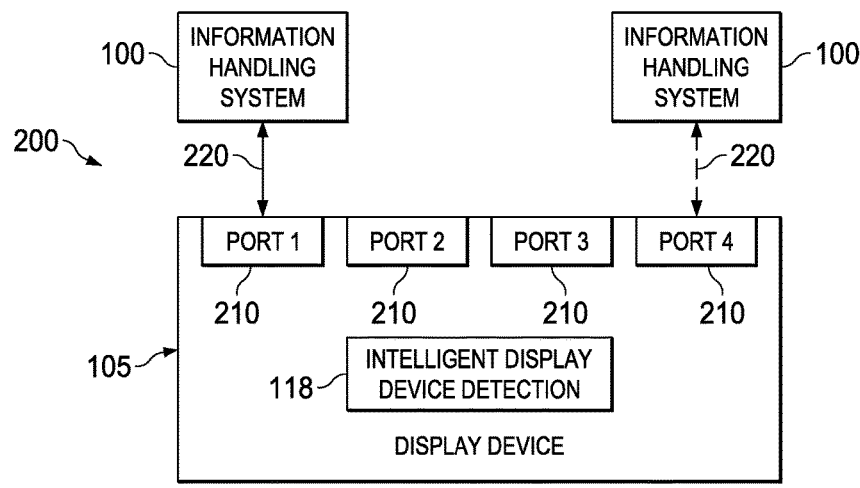
FIG. 2 shows a block diagram of an intelligent display device detection environment.

FIG. 2 shows an intelligent display device detection environment 200. More specifically, the intelligent display device detection environment 200 includes a first information handling system 100a, a second information handling system 100b and a display device 105. The display device 105 includes the intelligent display device detection module 118. The display device also includes a plurality of display device input ports 210 (e.g., Port 1, Port 2, Port 3, Port 4). In certain embodiments, one or more of the input ports 210 may be bidirectional. The intelligent display device detection environment 200 also includes one or more video cables 220 for coupling an information handling system 100 with the display device 105. It will be appreciated that in certain embodiments, one or more information handling systems 100 may be wirelessly coupled with the display device 105 and the intelligent display device detection operation functionally determines when an information handling system 100 is wirelessly coupled with the display device.

In certain embodiments, the intelligent display device detection operation performs a source detection operation. The source detection operation performs an automatic search for an active input port according to a predetermined search priority. The predetermined search priority defines a hierarchical order in which the input ports are searched. In certain embodiments, the input ports are searched in the following order: a Video Graphics Array (VGA) input port, a Digital Video Input (DVI) input port, a DisplayPort (DP) input port, a mini DisplayPort (mDP) input port, a first high definition multimedia interface/mobile high-definition link (HDMI/MHL) input port and a second HDMI/MHL input port.

In certain embodiments, the intelligent display device detection operation performs a cable detection operation. The cable detection operation automatically detects when a cable 220 is coupled to an input port 210. Upon this detection, the intelligent display device detection operation automatically switches the input source to correspond to the input port to which the cable has been coupled.

In certain embodiments, the intelligent display device detection operation performs a port return operation. The port return operation returns the input source to correspond to a last valid port upon detection of removal of the most recently coupled information handling system. For example, when the most recently coupled information handling system is muted or decoupled from the display device, the intelligent display device detection operation automatically returns the input source to correspond to the last active input port. In certain embodiments, the port return operation when the input source receives an out of range (OOR) signal indicating that the provided video signal is out of range of the display device or a NoSignal signal indicating that the information handling system being decoupled, the intelligent display device detection operation automatically returns the input source to correspond to the last active input port.

In certain embodiments, the intelligent display device detection operation includes an auto select enable operation. In certain embodiments, the auto select enable operation enables a user to override the intelligent display device detection operation and select a preferred input port. In certain embodiments, the auto select enable operation enables a user to disable the intelligent display device detection operation. In certain embodiments, the auto select enable operation includes a plurality of auto select modes of operation. In certain embodiments, the plurality of auto select modes of operation include one or more of a normal display out of range (OOR) mode of operation and a no cable mode of operation. With the normal display OOR mode of operation the auto select function is maintained even if a user selects a different input port as a preferred input port. With a no cable mode of operation, the auto select function is temporarily disabled but will be recovered either by a cable unplugged even or a power cycle event.

In certain embodiments, the intelligent display device detection operation includes a source selection indication operation. The source selection indication operation provides a user with an indication of a source selection. In certain embodiments, the indication includes a visual indication (e.g., a tick) presented via a display device on screen display menu. In certain embodiments, the indication is presented whether or not the auto select operation is enabled.

In certain embodiments, the intelligent display device detection operation includes a power cycle operation. With the power cycle operation, when the display device is reset (e.g., via a power off/power on power cycle), the auto select function is recalled and will perform according to an original auto select action matrix.

In certain embodiments, the intelligent display device detection operation is automatically disabled when a multi input mode of operation such as one or more of a DisplayPort (DP) multi stream transport (MST) mode of operation, a picture in picture (PIP) mode of operation and/or a picture by picture (PBP) mode of operation is enabled on the display device 105.

Figure 3:
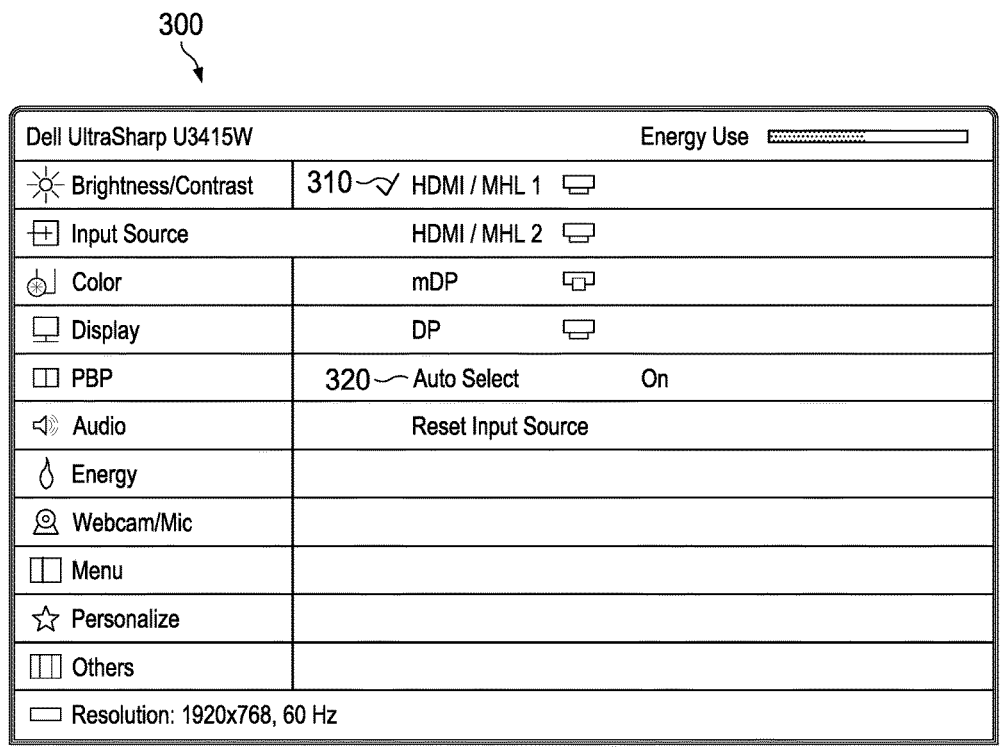
FIG. 3 shows an example screen presentation of an on screen display of an intelligent display device detection operation.

FIG. 3 shows an example screen presentation of an on screen display 300 of an intelligent display device detection operation. The on screen display 300 includes an indication 310 of a selected input source. In certain embodiments, the on screen display provides an ability for a user to disable the auto select function of the intelligent display device detection operation. More specifically, in certain embodiments this ability is provided via an auto select enable menu selection 320. In certain embodiments, the auto select enable menu selection 320 is presented as inactive (e.g., is grayed out) when the auto select function is not applicable (e.g., when the display device is functioning in a PIP mode of operation).

FIG. 4 shows a matrix 400 of the intelligent display device detection operation when performing an intelligent detection function. When there is an existing input source from an information handling system 100 and a user couples a mobile device type information handling system to the display device 105, the display device detects the mobile device type information handling system even if the mobile device type information handling system is not generating a video signal. The intelligent detection function retains information regarding a last active port of the display device.

In certain embodiments, the intelligent detection operation follows the behavior presented in the matrix 400. For example, referring to the rows 410 of the matrix 400, when devices are coupled to all four input ports (ABCD) and the current input port (i.e., the D input port) is unplugged or does not have signal, the system will display information from the last input port (e.g., the C input port). Referring to the rows 420, when devices are coupled to three input ports (ABC) of the display device 105 and the current input port (i.e., the C input port) is unplugged or is not receiving an input signal, the system will display the last input port (e.g., the B input port). It will be appreciated that the order of the valid signals presented in the matrix 400 is not exhaustive and the intelligent detection function is not necessarily limited to the behavior presented in the matrix 400.

FIG. 5 shows an example screen presentation of an on screen display input source list 500 of an intelligent display device detection operation. The on screen display input source list 500 includes an auto select indication 510 as well as a list 520 of other available input sources for the display device. The on screen display input source list 500 allows a user to select the auto select function or manually select one of the other available input sources by actuating the entry on the on screen display (e.g., via a control mechanism included within the display device 105). The auto select function or the selected input source is identified with an identification indicia (e.g., a tick). In the example screen presentation 500 the HDMI input source is selected.

When a user enables the auto select function, the auto select function automatically selects the next available input source. In certain embodiments, the auto select function is the default selection upon powering on or resetting the display device. In certain embodiments, the search order of the auto select function follows the list of inputs in a top down and wrap around manner starting with the current input source.

In certain embodiments, the on screen display input source list 500 is presented upon power on or resetting of the display device 105. In certain embodiments, after the auto select function or an input source is selected, the on screen display input source list does not automatically appear again unless the display device is power cycled or reset. In certain embodiments, the auto select function continues to function even if the auto selection in the on screen display main menu is switched off.

In certain embodiments, when the auto select function switches the display input to another available input source, the intelligent display device detection operation does not present any message when the image from the newly selected input source appears.

FIG. 6 shows a matrix 600 of the intelligent display device detection operation when performing an auto select intelligent detection function. More specifically, the matrix 600 specifies the function of the auto select intelligent display device detection operation when performing a source detection function 610. The matrix 600 specifies the function of the intelligent display device detection operation when performing a cable detection function 612. The matrix 600 specifies the function of the intelligent display device detection operation when performing an unplug cable function 614. The matrix 600 specifies the function the intelligent display device detection operation when performing a power cycle function 616.

With the source function 610 if source A and source B exist, source A is selected. If only source B is present, source B is selected. With the cable detection function 612, assuming both sources are present, if showing source A and now source B cable is attached, then source B will be selected. With an unplug cable function 612 assuming both sources are present, if showing source A with now source A cable is unplugged, source B will be selected. With a power cycle function 616, if the information handling system power is cycled, the input port will return to last known valid source.

FIG. 7 shows a matrix 700 of the intelligent display device detection operation when performing a user select intelligent detection function. More specifically, the matrix 700 specifies the function of the user select intelligent display device detection operation when performing a source detection function 710. The matrix 700 specifies the function of the intelligent display device detection operation when performing a cable detection function 712. The matrix 700 specifies the function of the intelligent display device detection operation when performing an unplug cable function 714. The matrix 700 specifies the function the intelligent display device detection operation when performing a power cycle function 716.

FIG. 8 shows an example screen presentation of an on screen display during an information handling system standby mode of operation 800 of an intelligent display device detection operation. More specifically, when the display device 105 enters a standby mode of operation due to not receiving a video signal from the device coupled to the video input, actuating a key on the display device will cause the on screen display to present a standby information screen presentation 810. The standby information screen presentation provides a user with information regarding how to exit the standby mode of operation. For example, in certain embodiments, the standby information screen presentation can indicate actuating any on screen display key on the display device 105 will cause the intelligent display device detection operation to present the standby information.

Additionally, in certain embodiments, actuating any on screen display key will cause the intelligent display device detection operation to present an input selection screen presentation (such as input selection screen presentation 500). In certain embodiments, the standby information screen presentation informs a user that there is no signal coming from their information handling system and that the user can press any key on the keyboard or move the mouse to wake the information handling system or press the first again to switch to another video source. In certain embodiments, the standby information screen presentation times out after a predetermined amount of time (e.g., after 10 seconds).

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for an intelligent display device detection operation, comprising:
    presenting a video stream from a first information handling system on a display device coupled to a first video input of the display device;
    determining when a second information handling system is coupled to a second video input of the display device; and,
    automatically switching a video input from the first video input to the second video input, the automatically switching automatically presenting a second video stream from the second information handling system on the display device.

2. The method of claim 1, wherein:
    the determining when a second information handling system is coupled to the second video input is performed even if the second information handling system is not powered on.

3. The method of claim 1, wherein:
    the determining when a second information handling system is coupled to the second video input comprises performing a signal detection operation, the signal detection operation detecting when a video input port is receiving a video signal.

4. The method of claim 1, wherein:
    the determining when a second information handling system is coupled to the second video input comprises performing a cable detection operation, the cable detection operation detecting when cable is coupled to a video input port.

5. The method of claim 1, further comprising:
    automatically switching the active video input from the second video input to the first video input, when the second information handling system is decoupled from the display device.

6. The method of claim 1, further comprising:
disabling the automatically switching when the display device is functioning in a multi input mode of operation.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
presenting a video stream from a first information handling system on a display device coupled to a first video input of the display device;
determining when a second information handling system is coupled to a second video input of the display device; and,
automatically switching a video input from the first video input to the second video input, the automatically switching automatically presenting a second video stream from the second information handling system on the display device.

8. The system of claim 7, wherein:
the determining when a second information handling system is coupled to the second video input is performed even if the second information handling system is not powered on.

9. The system of claim 7, wherein:
the determining when a second information handling system is coupled to the second video input comprises performing a signal detection operation, the signal detection operation detecting when a video input port is receiving a video signal.

10. The system of claim 7, wherein:
the determining when a second information handling system is coupled to the second video input comprises performing a cable detection operation, the cable detection operation detecting when cable is coupled to a video input port.

11. The system of claim 7, wherein the instructions are further configured for:
automatically switching the active video input from the second video input to the first video input, when the second information handling system is decoupled from the display device.

12. The system of claim 7, wherein the instructions are further configured for:
disabling the automatically switching when the display device is functioning in a multi input mode of operation.

13. A non-transitory, computer-readable storage medium embodying computer program code, the computer program code comprising computer executable instructions configured for:
presenting a video stream from a first information handling system on a display device coupled to a first video input of the display device;
determining when a second information handling system is coupled to a second video input of the display device; and,
automatically switching a video input from the first video input to the second video input, the automatically switching automatically presenting a second video stream from the second information handling system on the display device.

14. The non-transitory, computer-readable storage medium of claim 13, wherein:
the determining when a second information handling system is coupled to the second video input is performed even if the second information handling system is not powered on.

15. The non-transitory, computer-readable storage medium of claim 13, wherein:
the determining when a second information handling system is coupled to the second video input comprises performing a signal detection operation, the signal detection operation detecting when a video input port is receiving a video signal.

16. The non-transitory, computer-readable storage medium of claim 13, wherein:
the determining when a second information handling system is coupled to the second video input comprises performing a cable detection operation, the cable detection operation detecting when cable is coupled to a video input port.

17. The non-transitory, computer-readable storage medium of claim 13, wherein the instructions are further configured for:
automatically switching the active video input from the second video input to the first video input, when the second information handling system is decoupled from the display device.

18. The non-transitory, computer-readable storage medium of claim 13, wherein the instructions are further configured for:
disabling the automatically switching when the display device is functioning in a multi input mode of operation.

* * * * *